Patented Nov. 22, 1927.

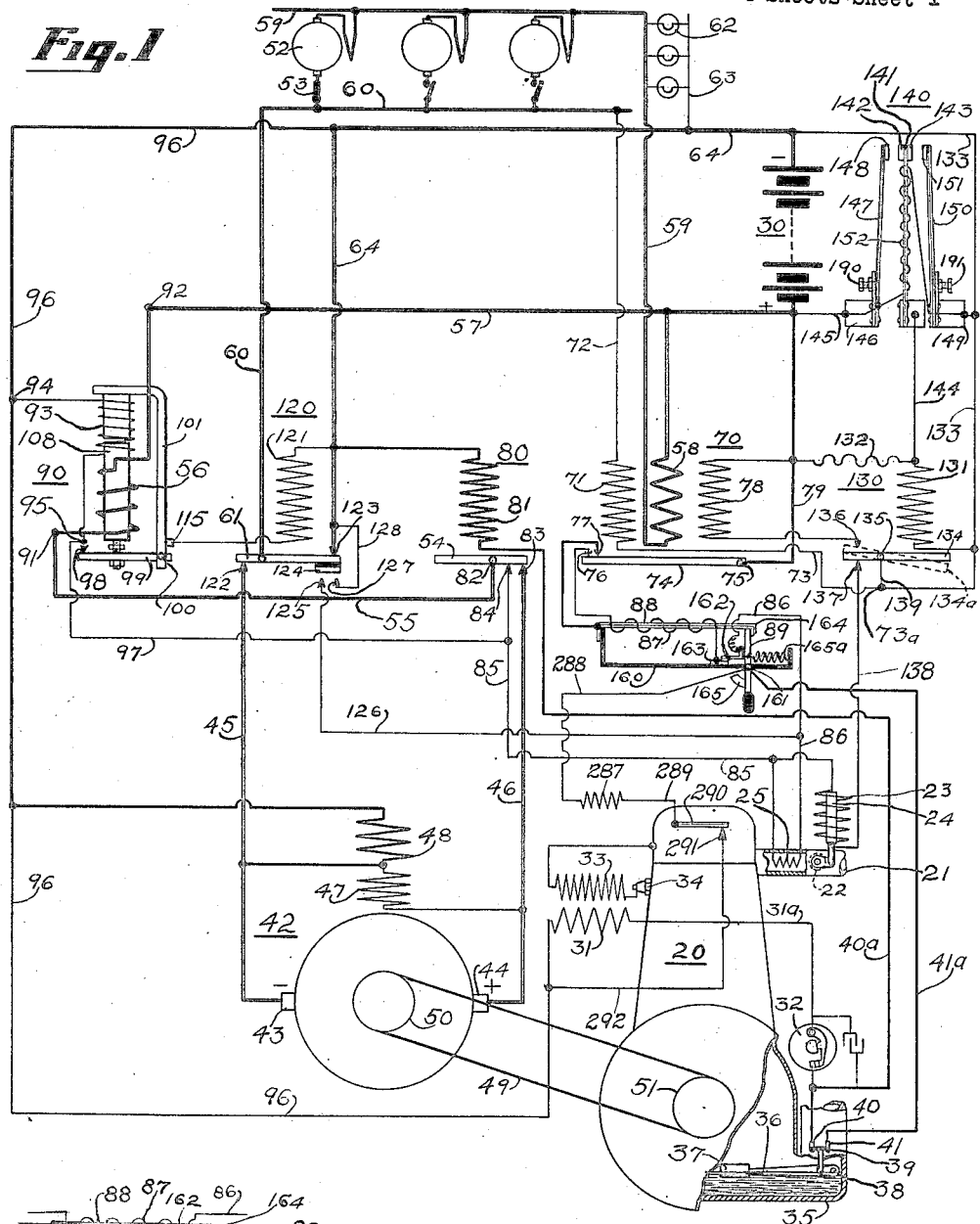

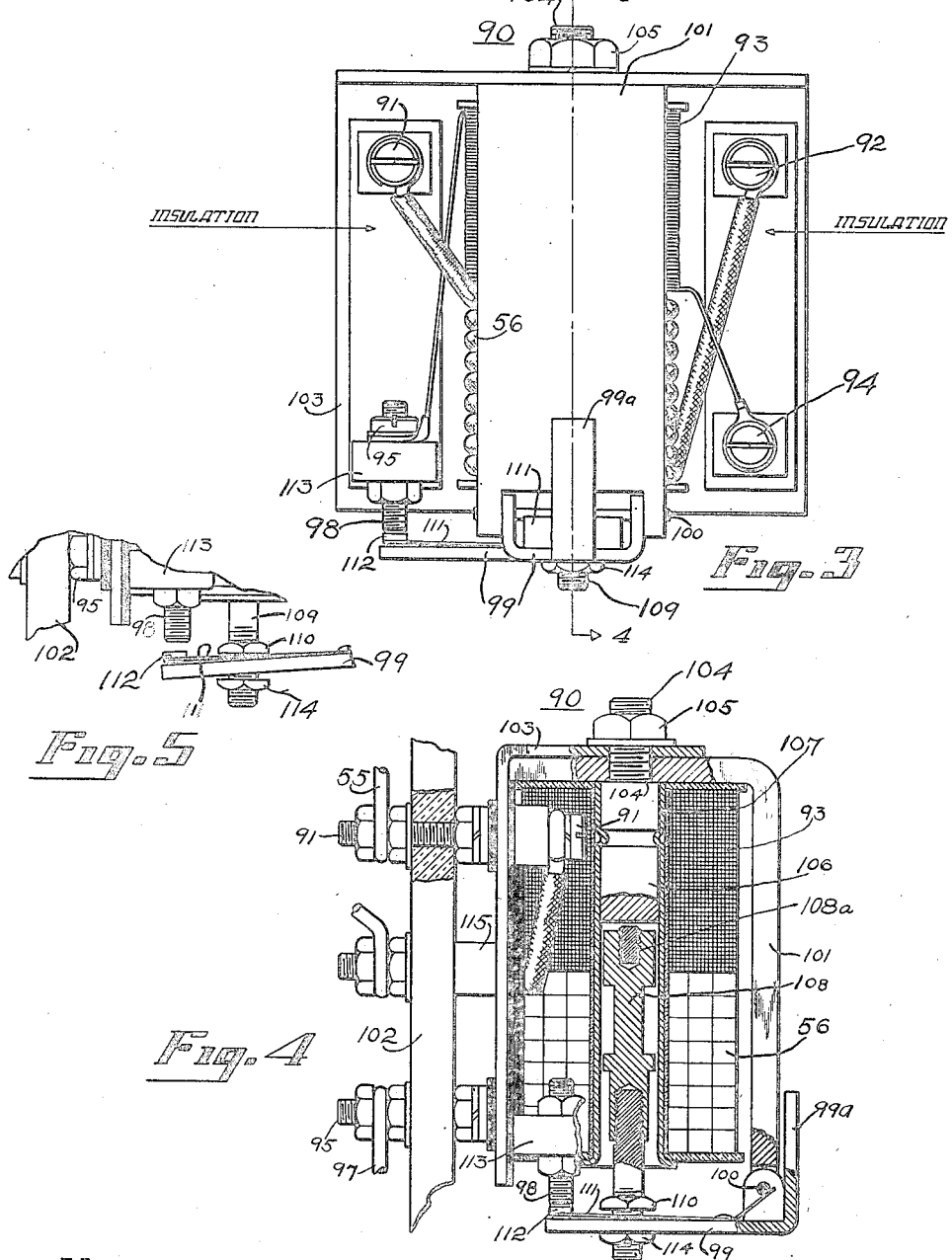

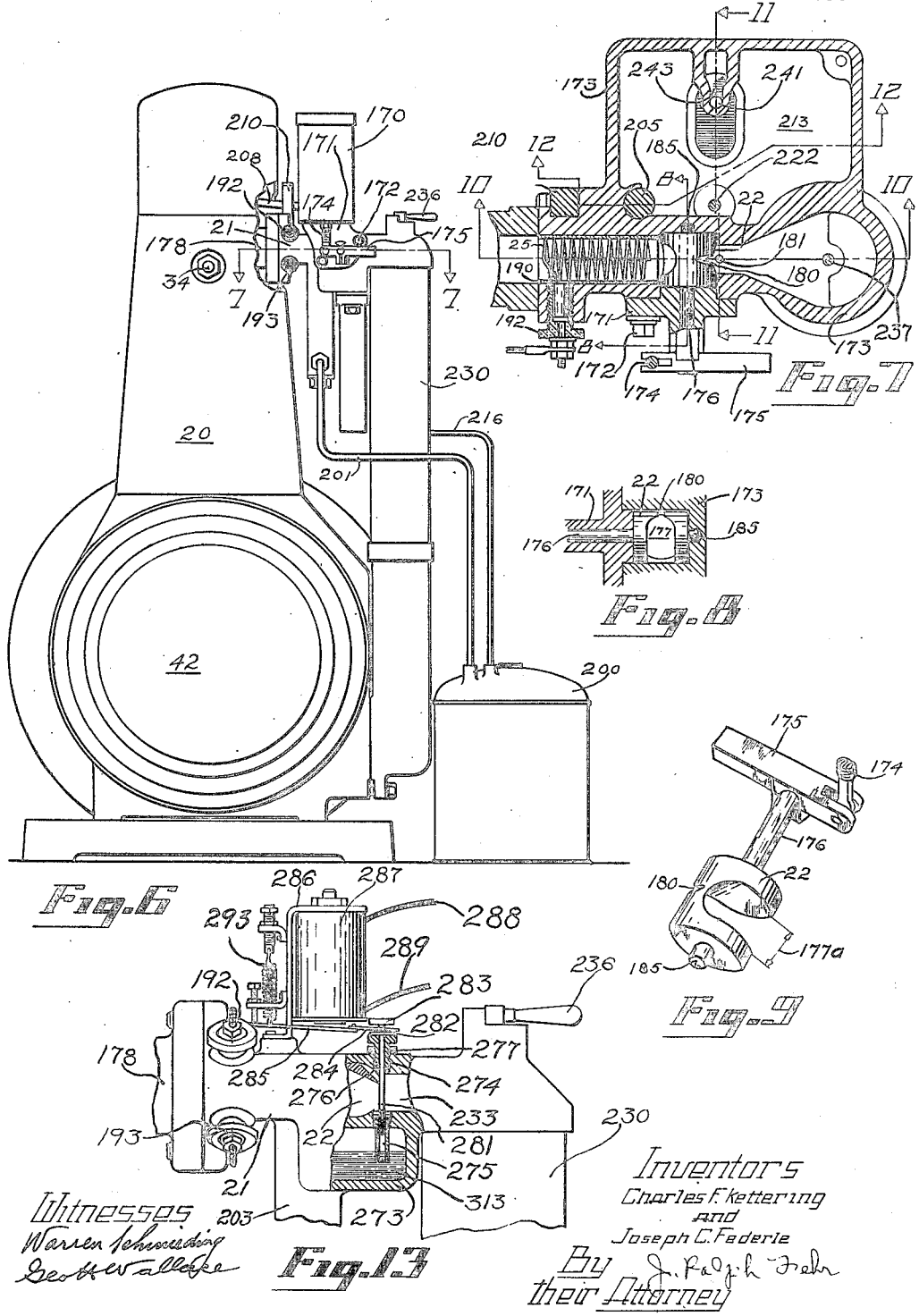

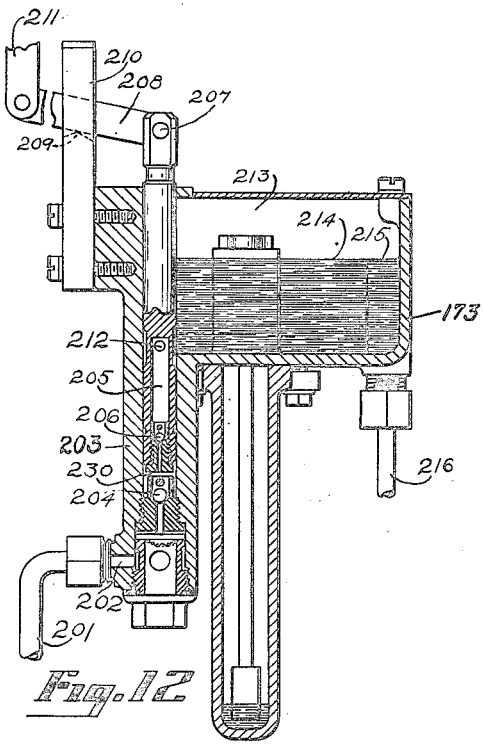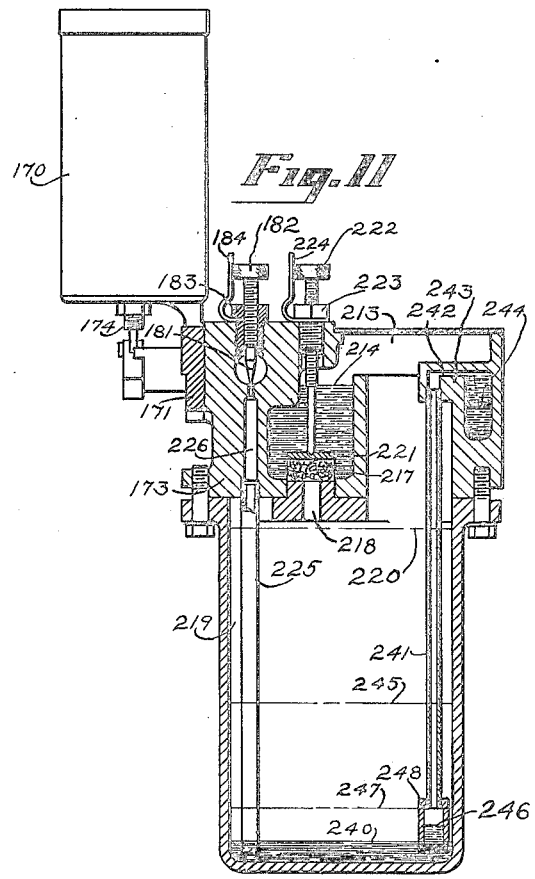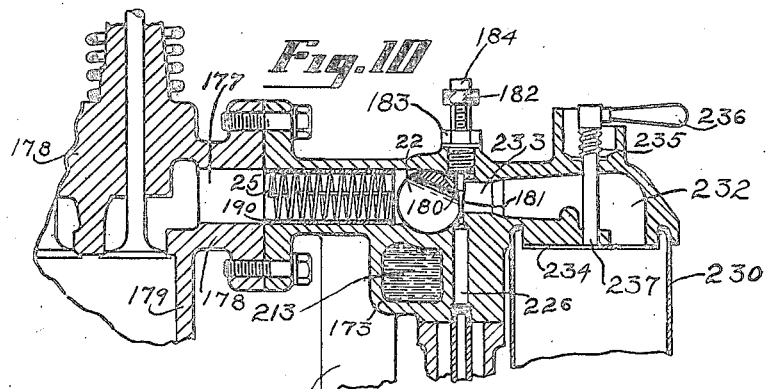

1,650,523

UNITED STATES PATENT OFFICE.

CHARLES F. KETTERING AND JOSEPH C. FEDERLE, OF DAYTON, OHIO, ASSIGNORS TO DELCO-LIGHT COMPANY, OF DAYTON, OHIO, A CORPORATION OF DELAWARE.

ELECTRICAL APPARATUS.

Application filed September 23, 1922. Serial No. 589,991.

This invention relates to electrical generating systems including a power plant wherein the starting and stopping of the power plant is controlled automatically.

An electrical system of this kind is disclosed in the copending application of Charles F. Kettering, Serial No. 589,992 filed September 22, 1922. In that application the electrical system includes a prime mover and a dynamo, a power circuit including electrical translating devices each of which consume a relatively large amount of current, and a lighting circuit including electrical translating devices such as lamps, small fan motors, and the like which make relatively small demands for current. In said application the plant is started automatically whenever there is any demand in the power circuit or when there is a demand in the lighting circuit in excess of a certain amount. The automatic means provides for getting the prime mover started and up to generating speed within a certain time interval after the automatic device has started to operate. At the end of this interval the automatic device will connect the dynamo with the work circuit and current will be supplied thereto provided the plant has been started within this time interval.

The aims of the present invention are to provide an automatic generating plant of the character described in the Kettering application referred to but in particular, it is among the objects of the present invention to simplify the automatic controller which starts and stops the plant, and to provide a controller which will connect the dynamo with the work circuit as soon as the dynamo has attained a substantial generating speed.

The automatic device of the present invention includes some of the features disclosed in the application referred to namely; the automatic device will cause the plant to operate in response to a demand by a power line or in response to an excess demand in the lighting circuit or when the battery has reached a predetermined state of discharge. The plant will stop automatically when the demand in the power line ceases, when the excess demand in the light circuit ceases, or when the battery has reached a predetermined state of charge; and in case the plant is started upon the battery being discharged the charging of the battery will continue although a demand in the work circuits is made and is discontinued in the meantime; and in case the battery has reached a predetermined state of discharge before a work circuit demand is discontinued then the plant will continue to operate until the battery has reached the predetermined state of charge.

In the application referred to, the state of charge of the battery was determined by an ampere hour meter but in the present invention it is an object to determine the battery charge in accordance with the voltage of the battery. In this connection it is an object to provide such a control of the automatic starting and stopping means in response to battery voltage that the plant will be started only when the battery voltage reaches a predetermined low point and the plant will be stopped when the battery voltage reaches a predetermined high point.

It is a further object to render the automatic controller inoperative automatically in order to discontinue the starting operation if the engine has failed to start after a certain time interval, and to provide for rendering the automatic controller operative again whether or not the aforesaid demands of the work circuits have been discontinued.

A further object of the invention is to provide means for automatically rendering a throttle governor for the engine operative after the battery has reached a predetermined state of charge.

Other and further objects and advantages of the present invention will be apparent from the following description, reference being had to the accompanying drawings, wherein preferred embodiments of the present invention are clearly shown.

In the drawings:

Fig. 1 is a wiring diagram of an automatic generator system constructed in accordance with the present invention;

Fig. 2 is a view of one of the controllers shown in Fig. 1, the controller in this view is shown having its contacts in open position;

Fig. 3 is a side elevation of one of the relays included in the present invention;

Fig. 4 is a sectional view taken on the line 4—4 of Fig. 3;

Fig. 5 is a fragmentary view of the relay shown in Figs. 3 and 4 with certain parts in other positions;

Fig. 6 is an end view of an internal-combustion engine comprising the prime mover of the disclosed embodiment of the invention;

Fig. 7 is a sectional view on the line 7—7 of Fig. 6;

Fig. 8 is a sectional view taken on line 8—8 of Fig. 7; showing a portion of the throttle valve;

Fig. 9 is a perspective view of a portion of the throttle valve;

Fig. 10 is a sectional view on the line 10—10 of Fig. 7;

Fig. 11 is a sectional view on the line 11—11 of Fig. 7;

Fig. 12 is a sectional view on the line 12—12 of Fig. 7; and

Fig. 13 is a sectoinal view of a modification of the device shown in Figs. 6 to 12.

Prime mover and dynamo.

The prime mover comprises an internal-combustion engine 20 having an intake 21 which is controlled by a throttle valve 22 especially constructed to meet the requirements of a plant of this kind. This throttle valve will be described in detail later. The valve 22 is controlled electrically by means of a magnet coil 23 for actuating a solenoid armature 24 which is connected with the valve in a manner to be described. The intake 21 is arranged to be heated by an electrical heating coil 25 in order to facilitate engine starting. Ignition for the engine is provided by current from a battery 30 conducted in a manner to be described through an ignition coil having a primary 31 connected in series with a spark timer 32, and having a secondary 33 attached to a spark plug 34. The engine 20 is provided with a crank case 35 for containing a quantity of lubricant the upper level being indicated at 36. A float lever 37 pivoted at 38 maintains a contact 39 in engagement with contacts 40 and 41, when the lubricant is at or above the level 36. In case the lubricant falls below this level the contact 39 will be separated from contacts 40 and 41.

The engine 20 drives a dynamo 42 having its armature connected by commutator brushes 43 and 44 which are connected with wires 45 and 46 respectively. Dynamo 42 includes a shunt field winding 47 connected between wires 45 and 46 and a series winding 48 connected with the wire 45 and with an engine cranking circuit to be described. Dynamo 42 is preferably directly connected with the engine, that is, the armature shaft is directly supported by the engine crank shaft as illustrated in the Patent #1341327, issued May 25, 1920 to Kettering and Chryst. For purposes of illustration the belt and pulley connection 49, 50, and 51, is shown in Fig. 1.

Power and lighting circuits.

The power circuit includes a plurality of translating devices each requiring a relatively large amount of current. Such devices may be power motors 52, each of which is controlled by a switch 53 and is connected between a power line including wire 46, armature 54, wire 55, magnet winding 56, wire 57, magnet winding 58, and wire 59, and a power line including wire 60, armature 61, and wire 45. The lighting circuit includes translating devices, such as lamps 62, which require a relatively small amount of current. The lighting circuit includes wire 57, winding 58, and wire 59 on one side of the line, and wires 63 and 64 on the other side of the line.

Automatic controller.

The automatic controller comprises in the main the following elements, the starting switch relay 70, the starting switch 80, the load switch relay 90, the load switch 120, a battery voltage relay 130, and a battery voltage relay controller 140.

The starting switch relay 70 includes the magnet winding 58, a magnet winding 71, connected by wire 72 with wire 60 and connected by wire 73 with a terminal 73ᵃ. The capacity of wire of winding 58 is sufficient to carry the maximum current demand, and the ampere turns of this winding are sufficient that when the demand for current in the lighting circuit exceeds a certain amount the relay will be energized sufficiently to cause the attraction of an armature 74, which is pivoted at 75, into engagement with contacts 76 and 77. When the plant is inoperative armature 74 is held by gravity or by spring pressure out of engagement with contacts 76 and 77. The winding 71 comprises a relatively large number of turns of relatively fine wire so that the relay will be energized sufficiently to attract the armature 74 when this winding 71 is connected to the battery. The resistance of this winding is high so that it will consume very little current from the battery when connected thereto. The relay 70 includes a third magnet winding 78 which is connected by wire 79 which connects the armature 74 with battery 30. This winding 78 is controlled by the battery voltage relay 130 in a manner to be described.

The starting switch 80 includes the armature 54 which is magnetically operated by means of a magnet winding 81. When energized this winding produces the attraction of armature 54, which is magnetizable and is pivoted at 82, into engagement with contact 83 connected with wire 46 and into engagement with contact 84 which is connected by wire 85 leading to the intake heating coil 25 and the throttle valve winding 24. Coil 25 is connected by wire 86, and contacts 162 and 163 with a cranking cut-out heating element 87 which is connected to contact 76 and surrounds a bi-metallic thermostatic blade 88 (included in the cranking cut-out switch) which is connected electrically at its fixed end with the contact 77 and has its free end normally engaging a contact 89 connected by wire 41ª to the oil level switch contact 41. The other oil level switch contact 40 is connected by wire 40ª with the starting switch magnet winding 81.

The load switch relay 90 includes the magnet winding 56 having relatively few turns of coarse wire for carrying the maximum demand of the work circuits and the maximum demand of current for the engine cranking operation. The winding 56 is preferably connected with terminals 91 and 92. There is a second magnet winding 93 of relatively large number of turns of fine wire. This winding 93 is connected with a terminal 94 and with a terminal 95. Terminal 94 is connected with wire 96 which connects wire 64 with the dynamo series field winding 48, and with the ignition coil primary winding 31. The terminal 95 is connected with wire 97 which leads to wire 85 and also with a contact 98 adapted to be engaged by lever 99 pivoted at 100 upon a magnet frame 101. Normally the lever 99 is out of engagement with the contact 98 but when the plant is operative to supply current to the work circuits then this engagement is made as shown in Fig. 1.

The load switch relay 90 is shown in detail in Figs. 3, 4, and 5. An instrument board 102 of non-conducting material supports a bracket 103, this bracket being attached to 102 by means of the terminals 91, 92, and 94 which are all insulated from the bracket 103. Bracket 103 is attached by means of a bolt 104 and nut 105 with the magnet frame 101. The head 106 of bolt 104 serves as a part of the magnet core and it is to be noted that the end of this head 106 terminates above the lower side of the magnet winding 93. The bolt head 106 supports a non-magnetizable tube 107 which in turn supports the magnet windings 93 and 56. The tube 107 provides a guide for the magnetizable plunger 108 which is normally supported upon the lever 99 by means of a non-magnetizable rod 109 passing through a hole in the lever 99 and carrying a nut 110 which rests upon a leaf spring 111 attached to the lever 99 and carrying a contact 112 for making connection between the lever 99 and the contact 98. The contact 98 has screw threaded attachment to a block 113 supporting terminal 95 and supported by bracket 103 but insulated therefrom. The rod 109 carries another nut 114, adapted to engage the underside of lever 99 to move the same into the position shown in Figs. 3 and 4. The nuts 110, 114 are spaced so that a certain upward motion of the plunger 108 will take place before the lever 99 will be moved. A portion of the lever 99 is bent around as at 99ª so as to engage the side of frame 101 and thereby limit the downward movement of the plunger 108. The range of movement of the plunger 108 is limited so that the upper end of plunger 108 will always be above the coil 56 and partly within the coil 93 for a purpose to be described later. The bracket 103 serves as a conductor and is provided with a terminal 115 grounded thereon.

The load switch 120 is also electrically controlled and includes a magnet winding 121 which is connected with the load switch relay terminal 115 and with wire 64. Load switch 120 includes the armature 61 which is adapted to engage, when attracted by the magnet 121, with a contact 122 connected with wire 45 and with a contact 23 connected with wire 64. Armature 61 carries an insulated conductor 124 which is adapted to engage a contact 125 which is connected with wire 126 and to engage a contact 127 which is connected by wire 128 with wire 64. When the plant is not operative the armature 61 is out of engagement with contacts 122 and 123 and engagement is made between contacts 124, 125 and 127.

The battery voltage relay 130 includes a magnet winding 131 which is connected in series with a resistance element 132 connected with wire 79. One end of winding 131 is connected to a wire 133 which connects the battery with the terminal 73ª of the starting switch relay 70. The relay 130 includes an armature 134 pivoted at 135, and which in inoperative position engages a contact 136 which is connected with a winding 78 of the relay 70. When armature 134 is attracted as shown in Fig. 1 it engages a contact 137 attached by wire 138 to the throttle control magnet winding 23. A wire 139 connects armature 134 with wire 133.

The battery voltage relay controller 140 is a device which is capable of short circuiting either the magnet coil 131 or the resistance element 132. For this purpose the controller 140 includes a thermostat blade 141 carrying contacts 142 and 143 and having its fixed end attached by wire 144 to the common terminal of coil 131 and resistance 132. The battery 30 is connected by wire 145 to a bracket 146 carrying the fixed end of a thermostat blade 147 having a contact 148. The wire 133 is connected to a bracket 149 carrying the fixed end of a thermostat blade 150 having a contact 151. The blades 147, 141, and 150 are similarly constructed and mounted so that the reduction of temperature causes them to bend to the right as viewed in Fig. 1 and an increase in temperature causes them to bend to the left the same amount for each increment in temperature increase therefore the functioning of controller 140 will remain constant with changes in environment temperature. The normal position of the blade 141 is such as to cause contact 143 to engage contact 151, and before this blade 141 can move to the left with respect to the blade 150 the temperature of blade 141 must be increased substantially above environment temperature. To accomplish this an electrical heating unit 152 connected with brackets 146 and 149 is mounted in heating relation to the blade 141.

The initial position of blades 147 and 150 can be adjusted by screws 190 and 191 respectively which have threaded engagement with brackets 146 and 149, respectively, and bear against the blades. If screw 190 be withdrawn to the left then the distance between contacts 148 and 151 will be increased and the coil 152 must be heated more before contact 142 can engage contact 148. The advantage of this feature will be more apparent hereinafter.

*Operation of the plant-starting.*

In general the operation of the controller to start the plant is as follows: Assume first that the engine is inoperative in which event the armatures 74, 54, 61 and 99 will not be in contact making position. Of course, the contact 124, will initially engage the contacts 125, and 127. A demand for current from the dynamo will cause the starting switch relay 70 to make a circuit to the magnet of the starting switch 80, whereupon the starting switch will make the starting circuit. After the engine has become self-operative and has attained generating speed the load switch relay 90 will be energized in such a manner as to make a circuit to the magnet winding of the load switch whereupon the dynamo will be connected to the supply current to the battery and to the work circuit. When a demand for dynamo current is discontinued the relay 70 is de-energized whereupon the engine ignition circuit is broken and the starting switch circuit is broken at contact 77. The deenergizing of the starting switch will cause the armature 54 to move away from contact 83 whereupon the circuit between the dynamo and the work circuit and between the dynamo and the battery will be interrupted.

The lighting circuit is connected with the battery so as to receive current for operating the translating devices 62. If more than a certain number of these devices be connected with the battery, then the current passing through winding 58 will be sufficient to attract the armature 74 in the position shown in Fig. 1. If there be a demand for current in the power circuit, created by closing one of the motor control switches 53 as shown in Fig. 1, enough current will pass from the battery through the windings 71 and 58 in series to produce the attraction of armature 74. As already stated, the winding 71 is composed of a relatively large number of turns of fine wire, and this winding is of such a high resistance that only a very minute amount of current can pass to the power circuit while the winding 71 is in series with it. Practically, the current is so small that its presence would not be detected with any ordinary translating device, such as a lamp, and hence for all practical purposes it may be said that all current is withheld from the power circuit during starting while the winding 71 is in series with it, and that current is not supplied to the power circuit until the engine and generator are fully operative, as hereinafter explained. The armature 74 is attracted also when the winding 78 is energized. This is accomplished when the state of battery charge has reached such a low point that not enough current will be flowing through the heating element 152 to cause the contact 143 to remain out of engagement with contact 151. When these two contacts engage, the relay winding 131 will be short circuited by wire 144, blade 152, contact 143, contact 151, blade 150, and therefore the armature 134 will move clockwise about its pivot 135, and in so doing will move out of engagement with contact 137 and into engagement with contact 136. Thereupon the winding 78 will be connected with the battery and will receive sufficient current therefrom to produce the attraction of armature 74. Of course, the resistance element 132 is then connected in parallel with the coil 78, but the ohmic resistance of 132 is sufficiently high to prevent robbing the winding 78.

The moving of armature 74 into engagement with contacts 76 and 77 will cause the following ignition circuit to be established; battery 30, wire 79, armature 74, contact 77, thermostat blade 88, contact 89, wire 41ª, contacts 41, 39, and 40 timer 32, wire 31ª, ignition coil primary 31, wire 96, wire 64, back to battery. A circuit is also provided to the starting switch winding 81 when the armature 74 engages contact 77. This circuit includes wire 40ª, branching off between contact 40 and timer 32, winding 81 and wire 64. The energizing of magnet 81 will cause armature 54 to move into the position shown in Fig. 1 to make the following engine cranking circuit: battery 30, wire 57, terminal 92, relay winding 56, terminal 91, wire 55, armature 54, wire 46, brush 44, dynamo armature, brush 43, series winding 48, wire 96, wire 64, to battery 30. The dynamo shunt winding 47 is also connected cumulatively with the series field 48. It is to be remembered that during the cranking operation the armatures 99 and 61 of the load switch relay 90 and of the load switch 120, respectively, have not moved into the circuit making position shown in Fig. 1, therefore the load circuit is receiving no current from the dynamo.

During the cranking operation the following circuit is established to the heating coil 25: battery 30, wire 57, terminal 92, winding 56, terminal 91, wire 55, armature 54, contact 84, wire 85, heating coil 25, wire 86, wire 126, contacts 125, 124, 127, wire 128, wire 64 to battery 30.

Winding 93 of relay 90 is now receiving current through the following circuit; battery 30, wire 57, terminal 92, winding 56, terminal 91, wire 55, armature 54, contact 84, wire 85, wire 97, terminal 95, coil 93, terminal 94, wire 96, wire 64, back to battery. Although the winding 93 of the relay 90 is receiving current and magnetism is produced tending to attract the plunger 108 and to cause the lever 99 to be moved to connect with 98, current is flowing through the winding 56 from the battery in such a direction as to produce magnetism tending to pull the plunger 108 down and to keep the armature 99 in the position shown in Fig. 5. Therefore, the switch 120 cannot be energized to connect the dynamo or the battery with the load circuit. The usual reverse current relay is one which requires a reversal of current in the series so that both its series and shunt windings will act cumulatively to move the armature in the circuit making position. But the relay 90 is constructed so that the armature 99 will be moved into circuit making position after the engine becomes self-operative but slightly before it has attained sufficient speed for the dynamo E. M. F. to overcome the battery E. M. F. The relay 90 is constructed so that it will close the load switch magnet circuit while yet there is some current flowing from the battery through the winding 56. The dynamo E. M. F. then is bucking the battery E. M. F. so that current in the winding 56 has been reduced to permit the winding 93 to pull the plunger 108 up into the position shown in Figs. 1 and 3. When this occurs the following load switch magnet circuit will be established: battery 30, wire 57, winding 56, terminal 91, wire 55, lever 54, contact 84, wire 97, terminal 95, contact 98, armature 99, terminal 115, load switch magnet winding 121, wire 64, to battery 30. Thereupon the armature 61 which has been heretofore out of engagement with contacts 122 and 123 will move into engagement with these contacts as shown in Fig. 1, and the contact 124 will be moved out of engagement with the contacts 125 and 127 to break the circuit to the intake heating coil 25. This movement of the armature 61 will cause the series field winding 48 to be short circuited by wire 64, contact 123, armature 61, contact 122, and wire 45, and will complete the following circuit between the dynamo and the load circuit: brush 44, wire 46, contact 83, armature 54, wire 55, terminal 91, winding 56, terminal 92, wire 57, which leads to battery and to the work circuits through coil 58 and wire 59. The negative side of the line from the battery includes the wire 64, contact 123, armature 61, wire 45, negative brush 43. The negative side of the light circuit includes wire 63 leading to wire 64. The negative side of the load circuit includes wire 60 leading to armature 61.

*Operation of the plant-stopping.*

The stopping of the plant is also automatically controlled, and will occur under several conditions. Some of these conditions are normal and include the following: (1), cutting out a demand in the power circuit; (2), reducing the demand in the lighting circuit, below a certain value; and (3), a reaching of a certain state of battery charge. Other conditions which may cause the stopping of the plant are classed as abnormal conditions and include the following: (1), failure of the engine fuel supply: (2), lack of sufficient lubricating oil in the engine crank case; (3), failure of the ignition system; and (4), failure of the dynamo to generate sufficient current.

If demands for current in the load circuit cease and if the demand for current in the lighting circuit has been reduced below a certain amount then the armature 74 will no longer remain in attracted position provided the battery has not reached such a state of discharge as to cause the relay winding 78 to be connected with the battery. Of course, if this winding should be connected with the battery when current ceases to flow to the windings 71 and 58 then the armature 74 will not be released. It is apparent also that if the plant be started by the energizing of relay winding 78 the making and the ceasing of demands in the work circuit will not cause the plant to stop operating until the battery has reached a certain state of charge. Let it be assumed that the plant has been started by the falling off of battery voltage resulting in the engagement of contacts 143 and 151 and resulting in the short circuiting of relay magnet 131 as explained earlier in the specification, the armature 134 will be in the dotted line position 134ᵃ wherein the armature makes contact with the contact 136 to connect the coil 78 with the battery. The plant will operate to charge the battery, and, as the battery voltage goes up the current carried by the heating element 152 will increase and cause the blade 141 to bend away from the blade 150 as shown in Fig. 1. Now, although contacts 143 and 151 may be separated, and the short circuit of coil 131 be broken, yet there will not be enough current flowing through the coil 131 to attract the armature 134 to the full line position. Therefore the plant must continue to run until the battery voltage has increased to such an amount that enough current passes through the heating element 152 to cause the thermostat blade 141 to bend to the left and cause the contact 142 to engage the contact 148. When this happens the resistance 132 will be short circuited by wire 145, blade 147, contacts 148 and 142, blade 141, and wire 144 and enough current will flow through the winding 131 to attract the armature 134 to the full line position thereupon the circuit to the winding 78 will be broken and armature 74 will drop down, provided, of course, there is no demand in the power circuit and no excess demand in the lighting circuit. It is to be noted however that the battery remains connected to the lighting circuit to supply the demands thereof when not in excess of a predetermined amount. The battery does not start the plant as soon as its voltage drops from a predetermined high point corresponding to the normal full charge of the battery, but the starting is deferred until a predetermined low point of battery charge is reached. The postponement of starting is accomplished by reason of the fact that although the thermostatic blade 141 may bend to the right and move the contact 142 away from the contact 148 to cause the current in the winding 131 to be reduced, yet there will be enough current flowing through this winding to maintain the armature 134 in attracted position. Not until the current in the heating element 152 has fallen so low that the contact 143 returns to battery discharge position will the armature 134 be released and permitted to return to the dotted line position 134ª to cause the plant to start again.

In cold weather it is desirable to charge the battery to a higher voltage, hence the distance between contacts 151 and 148 should be increased. This is accomplished by turning screw 190 out of the bracket 146 so as to permit blade 147 to bend to the left. Then the voltage of the battery must be greater before the heating coil 152 will cause contact 142 to touch contact 148 than in the case where contacts 148 and 151 are closer together.

Any of these normal conditions being satisfied the starting switch relay 70 will be deenergized and the following circuits will be interrupted: When the contacts 76 and 77 are out of engagement with the armature 74, the ignition circuit will be broken thereby causing the engine to stop and the starting switch magnet circuit will be broken thereby causing the armature 54 to move out of engagement with contacts 83 and 84. This operation results in disconnecting the generator from the positive side of line and interrupting the circuit to the relay magnet winding 56 of the relay 90. There being no contact with contact 84, the winding 93 will be deenergized and permit the armature 99 to fall down to circuit open position; separation of armature 54 from contact 84 results in breaking the circuit to the load switch magnet 121 and this results in a movement of the armature 61 out of engagement with the contacts 122 and 123 to interrupt the negative side of the line from the dynamo to the battery and to the work circuits. The return movement of armature 61 will cause contacts 125 and 127 to be connected with the negative side of the battery and with the heating coil 25 but no current can flow to this coil because the connection with the positive terminal of the battery is broken when armature 74 moves away from contact 77.

The plant will stop, of course, in case of failure of the ignition system, and means are provided for disconnecting the dynamo from the work circuits and the power circuit from the battery upon the generator becoming inoperative by reason of the stopping of the engine. When the generator does not supply current to the battery the current will flow back to the battery through the relay 56 and when the engine has fallen below a certain speed enough current will flow through the winding 56 to pull the plunger 108 downwardly away from the magnet winding 93 thereby causing the armature 99 to be separated from the contact 98. When this happens the circuit from the load switch magnet 121 will be broken thereby disconnecting the dynamo from the power circuit. But the automatic controller will not cease functioning altogether at this instant in case the relay 70 is still energized. As long as this relay 70 is energized the starting switch 80 will be closed and current will be taken from the battery to crank the engine. This cranking operation will not continue indefinitely because the heating element 87 will soon heat up and cause the blade of cranking cut-out switch to separate from the contact 89. When this occurs the circuit to the starting switch magnet will be broken whereupon the starting operation will cease.

If there be a lack of engine fuel or a failure of the carburetor to function properly the engine would of course stop and the cycle of operation just described would take place. Of course the separation of blade 88 from contact 89 would open the ignition system.

In case of lack of lubricating oil, contact 39 will be separated from contacts 40 and 41 thereby interrupting the ignition circuit causing the engine to stop and the dynamo to be disconnected from the battery and work circuits in the manner described and the circuit to the starting switch magnet is also interrupted.

In case the generator should fail to function to oppose the counter E. M. F. of the battery then the winding 56 would receive enough current from the battery to pull the plunger 108 down and separate lever 99 from contact 98. Then the load switch will be released to disconnect the dynamo from the work circuits and cause the interruption of the short circuit around the dynamo series field when the armature 61 is separated from contact 123 but the cranking operation would continue provided the relay 70 is still energized. In such an event the heating coil 87 takes care of the system by causing the blade 88 of the cranking cut-out switch to be separated from contact 89 to interrupt the starting switch magnet circuit.

When the cranking cut-out switch blade 88 has been separated from contact 89, engagement is not automatically restored by the cooling down of the heating element 87 but contact 89 must be moved manually to circuit making position. What happens when blade 88 separates from contact 89 is shown by reference to Figs. 1 and 2. The blade 88 is mounted upon a non-conducting support 160 upon which the contact 89 is pivotally mounted at 161. Contact 89 carries an insulated contact 162 which is connected with wire 86 and this contact engages the contact 163 which is supported by bracket 160 and is attached to heating element 87. The normal position of the blade 88 is shown in Fig. 1 wherein a latching member 164 mounted on the free end of the blade 88 makes contact with the pivotal contact 89 and holds contact 89 in position against the action of spring 65ª which tends to produce clockwise rotation of contact 89. When the blade 88 bows upwardly so that the latch 164 clears the upper edge of contact 89 then contact 89 will move clockwise until it strikes a stop 165 supported by the bracket 160. Thereupon the circuit to the heating element 87 will be interrupted by the separation of contacts 162 and 163. Then the thermostat blade will return to normal position shown in Fig. 1 wherein the lower edge of the latch member 164 rests upon a non-conducting block insulating the contact 162 from the contact 89, and the circuit to the ignition and to the starting switch magnet which remains interrupted until restored manually. By moving the contact 89 so that contact 162 engages contact 163 to make a connection in the heating element circuit, the latch 164 will hook over the contact 89 and retain it in the position shown in Fig. 1 thereby making a connection in the ignition and starting switch magnet circuits.

The cranking cut-out switch is subjected to environment temperature, consequently, cranking may continue over a longer period in cold weather than in warmer weather.

*Summary of functions of automatic controller.*

The starting switch relay 70 operates, in response to a demand in the power circuit, or an excess demand in the lighting circuit, or to a certain state of battery discharge, to operate the following circuits:—
 (1) Closes ignition circuit.
 (2) Closes initial rich mixture device circuit.
 (3) Closes starting switch magnet circuit provided there is sufficient lubricating oil, and provided the thermostatic cranking cut-out switch 88 is closed.
 (4) Closes circuit to the cranking cut-out switch heating coil 87.

The relay 70 opens when the said demands are satisfied, but the battery demand when once made must be satisfied although the work circuit demands are discontinued.

The starting switch 80 is energized in response to the closing of relay 70, and operates the following circuits:—
 (1) Closes the starting circuit including the dynamo operating as a cumulative compound motor.
 (2) Closes circuits to the load switch relay 90 shunt and series coils.
 (3) Closes the intake heater circuit, the load switch 120 being open.
 (4) Closes the throttle governor magnet circuit, the battery demand being satisfied.

The switch 80 is deenergized when relay 70 opens, or when the oil level switch opens, or when the cranking cut-out switch opens, to operate the following circuits:—
 (1) Opens the positive line from the dynamo to the battery and work circuits.
 (2) Opens circuits to the windings of relay 90.
 (3) Opens intake heater circuit.
 (4) Opens throttle governor magnet circuit.

The load switch relay 90 is rendered operative by the closing of the starting switch 80, and is energized in response to a relatively small discharge from the battery to close the circuit to the load switch magnet. The load switch relay 90 opens when starting switch 80 opens, and also if the battery discharge exceeds a certain amount to be discussed in detail under the heading Operation of load switch relay.

The load switch 120 is energized in response to the closing of relay 90 to operate the following circuits:—
 (1) Short circuit series field of dynamo.

(2) Connect dynamo as a shunt wound generator to battery and to work circuits.

(3) Disconnect heating coil of cranking cut-out switch.

(4) Disconnect intake heating coil.

Load switch 120 is deenergized when relay 90 opens. If relay 90 opens because of battery discharge and the starting switch relay 70 remains closed, then switch 120 closes the circuit to the heating coil of the cranking cut-out switch which in turn disconnects the battery from the dynamo by interrupting the circuit to the starting switch.

If relay 90 opens because starting switch 80 opens, and also the starting switch relay is still closed, then the heating coil of the cranking cut-out is remade but the cranking cut-out will eventually break its own heating coil circuit.

The battery voltage relay 130 is energized by the battery arriving at a certain state of charge, and will operate the following circuits:—

(1) Opens circuit to winding 78 of relay 70.

(2) Closes circuit to throttle governor magnet.

Relay 130 remains energized until battery reaches a certain state of discharge to operate the following circuits:—

(1) Closes circuit to winding 78 of relay 70.

(2) Opens circuit to throttle magnet.

The oil level switch operates in response to low lubricant level to operate the following circuits:—

(1) Opens ignition circuit.

(2) Opens starting switch magnet circuit.

The cranking cut-out includes blade 88 heated by coil 87. When blade 88 is heated for a certain time, it bows sufficiently to operate the following circuits:

(1) Opens ignition circuit.

(2) Opens starting relay circuit.

(3) Opens its own heating coil circuit.

(4) Opens initial rich mixture device circuit.

*Operation of the load switch relay.*

The ordinary reverse current relay used in battery charging systems, is one which automatically connects the generator with the battery when the generator E. M. F. is sufficient to oppose the counter E. M. F. of the battery, and which automatically disconnects the generator from the battery when the generator voltage falls below a certain value in order to prevent battery discharge. Such a relay is common in automobile lighting systems where the generator simply supplies current to the battery and a separate starting motor is employed. In such a system the characteristic of the generator is not changed. That is, if a shunt wound generator is employed it remains a shunt wound machine throughout its entire generating operation.

In the present invention however the dynamo must act also as the motor for starting the engine, and it is provided with a strong series field winding which assists the shunt field in order to produce the necessary field strength for engine cranking. But during the generating operation this series field winding must be rendered inoperative because if differentially used in the generating circuit the field strength would be too low for generating purposes and if cumulatively used the field strength would be too high. The relay 90 operates automatically to render this series field winding inoperative as well as to close a generating circuit between the dynamo and the battery when a certain generating speed is attained and to open this circuit when the dynamo voltage falls below battery voltage.

In the present invention the dynamo acts as a differential field generator before the series field is cut out, therefore, its voltage is much less at any given speed than in the case it were a simple shunt field generator. Now since the relay 90 changes the characteristic of the dynamo from differential compound to shunt it is not necessary to have the dynamo, when having the differential characteristic, attain such a speed as to send current to the battery. Therefore the relay is constructed to change the characteristic of the dynamo from differential to shunt while yet there is some discharge from the battery. This change in characteristic having been made the voltage of the dynamo will almost instantly increase to a value such as to send current to the battery without there being any increase in engine speed.

While the relay operates to change the dynamo characteristic and establish a battery charging circuit in response to a certain battery discharge which is preferably very low, the relay must operate to disconnect the dynamo from the battery when the battery discharge is slightly in excess of this amount. Furthermore the relay must not operate to close its contacts any time during the engine cranking operation.

Briefly, the following conditions are imposed upon the relay: Let $X$ equal the amperes discharge from the battery to cause the relay to close, and let $Y$ equal the amperes discharge causing the relay to open. The relay will remain closed for values of current discharge between $X$ and $Y$. The relay must open at $Y$ amperes discharge and remain open for all values of battery discharge above $Y$ amperes. The relay having been closed must remain closed for all values of charging current. The $Y$ value must be maintained as low as possible so as to minimize the current discharged from the battery. And the $Y$ value must be less than the minimum current consumption by the dynamo when operating as a motor.

In order fully to understand the nature of the relay 90 one specific example is given. Suppose that the automatic system includes a 32 volt battery, and that the dynamo when operating as a motor will require 70 amperes battery discharge to start turning the engine, and that the minimum current consumption for cranking may be 15 amperes. By arranging and proportioning the shunt and series windings of the relay and also arranging their magnetic circuits it has been found practical to make the relay close when the battery discharge is 5 amperes and to make the relay open when the battery discharge is 9 amperes or greater. The relay is constructed so that the net ampere turns required to attract the plunger 108 to circuit closing position shown in Fig. 4 is 117 ampere turns, and at least 65 ampere turns are required to maintain the plunger 108 in circuit closing position. For this particular system the shunt winding has 6900 turns and its resistance is 1035 ohms. When the battery discharge is 5 amperes the shunt winding will produce 207 ampere turns of magnetism tending to move the plunger 108 upwardly, and the series winding having 18 turns will produce 90 ampere turns of magnetism tending to maintain the plunger 108 in downward position. The resultant is 117 ampere turns of magnetism tending to move the plunger upwardly and therefore the relay contacts will be closed. These results are computed on the basis that the battery voltage is 32 on the battery discharge. If the battery voltage be less than 32 then less than 5 amperes discharge will cause the relay to close.

Assuming that the engine is slowing down to a stop and that the dynamo is still generating and that the battery is fully charged, it is possible that with 9 amperes battery discharge the voltage across the terminals of winding 93 will be 35 volts. The ampere turns in the shunt will be 227 tending to hold the plunger in its upward position and the ampere turns in the series winding will be 162 tending to draw the plunger 108 downwardly. The resultant is 65 ampere turns tending to hold the plunger 108 up, and therefore slightly greater than 9 amperes battery discharge at 35 volts will cause the relay to open. If, during the slowing down of the engine, the battery is not fully charged then the relay will open at less than 9 amperes battery discharge, for example, if the battery voltage is 30.5 and the battery discharge is 7 amperes the relay will open. Obviously any battery discharge which is greater than 9 amperes will hold the contacts open. At a maximum 70 amperes discharge during cranking the ampere turns of the series winding 56 will greatly exceed the ampere turns of the shunt winding 95 and the resultant will be such that the plunger 108 will be attracted downwardly.

During the battery charging operation the current is reverse in the winding 56 so that windings 56 and 93 operate cumulatively to hold the plunger 108 in circuit making position.

The reasons advanced for the small differential in amperes between the contact closing and contact opening function of the relay are discussed in detail in the copending application of J. C. Federle Serial No. 592,155 filed October 3, 1922 wherein this particular relay 90 is described and claimed. It is believed that the smallness of this differential is accounted for by using a larger number of turns in the series coil than would be permissible if the series coil were wound around the shunt coil instead of below it, and by using the series coil to repel the field of the shunt coil and crowd the shunt coil field away from the plunger as the strength of the series coil field increases; and, vice versa, by crowding down the field of the series coil by the shunt coil field as the strength of the series coil field decreases.

It is to be noted that when the plunger 108 starts to fall substantially it will continue because the widening of the air gap between the plunger and core causes the shunt winding to become increasingly ineffective to hold the plunger in its upward position. Therefore the opening of the contacts is a very positive action. And on the other hand, when the plunger 108 has once ascended as far as to cause nut 114 to engage the lever 99, the air gap will be decreased and the winding 93 will be increasingly effective to continue the movement of the plunger to contact closing position. Consequently the closing of the contacts is a positive action.

The plunger 108 is provided with a nonmagnetic button 108ª in order to prevent contact of the plunger 108 with the core 106 and to limit the air gap between these members. The lost motion connection between the screw 109 and lever 99 permits the plunger to attain some momentum before the lever 99 is moved to contact making position. Therefore, the contact pressure between 112 and 98 is somewhat improved. During the cranking of the engine the relay contacts are held apart by gravity and magnetism and therefore accidental closing of the contacts during cranking is minimized.

*Electric throttle governor.*

It will be observed from Fig. 1 that the throttle governor magnet coil 23 is not connected across the line unless the battery voltage control relay armature 134 is in the full line position which position it occupies from the time the battery charge decreases from the high point down to the low point. During the battery charging operation the generator E. M. F. is approximately 5 volts higher than the battery E. M. F. and should the battery become fully charged and it is still desirable to operate the system because of an excess demand on the light circuit or a demand on the power circuit, the arrangement is such that when the battery is charged the armature 134 is attracted and engages contact 137 which causes the actuation of the throttle valve to control the speed of the engine to control the generator E. M. F. With this arrangement the generator voltage can be maintained at a voltage substantially equal to the voltage of a fully charged battery. This in effect has the characteristic of supplying current to the light line or power line at substantially the same E. M. F. as a charged battery while the battery merely floats on the charging line and is not over charged. When the battery E. M. F. lowers a certain amount but not enough to permit the armature 134 to fall out and the system was started due to other starting demands, the battery would receive a certain amount of charge but this charging would not be complete since the E. M. F. of the generator is limited by the throttle governor. In this manner the battery is fully charged only when the battery voltage relay control 140 functions to operate battery voltage relay. For example, the voltage of the battery when fully charged is 36 volts. The throttle governor will limit the generator voltage to 36 volts, so that the battery floats on the line while the work circuits are supplied at 36 volts. The throttle governor is shown in detail in Figs. 6, 7, 8, 9 and 10. The voltage coil 23 is contained within a tube 170 mounted on the bracket 171 which is attached by means of screws 172 to the engine carburetor frame or casting 173. The solenoid armature 24 (see Fig. 1) is attached by a rod 174 to an arm 175 which is attached to a shaft 176 supported by the bracket 171. The shaft 176 is formed preferably integrally with a rotatable throttle valve 22 which may be said to include a cylindrical barrel which has been nearly severed by means of a cylindrical cutting tool positioned with its shaft at right angles to the shaft 176 and having such a diameter that the distance 177ª (see Fig. 9) is substantially equal to the diameter of the full intake passage 177 leading out from the carburetor casting 173 and through the head 178 of an engine cylinder 179. The valve 22 is provided with a notch 180 in order to provide clearance for a needle valve 181 which is carried by an adjusting screw 182 threaded into bushing 180 which is screw threaded into the casting 173. A clip 184 is supported by the casting 173 to prevent accidental rotation of the screw 182 due to the vibration of the engine.

The heating coil for the intake is preferably contained within a refractory and non-conducting tube 190 located within the passage 177; and the terminals of the coil 25 are supported by non-conducting bushings 192 and 193 which are screw threaded into the casting 173.

Engine fuel supply.

The engine fuel supply means is constructed and arranged to provide the engine with an initially rich fuel mixture in order to facilitate engine starting. This initially rich mixture is not always supplied to the engine for the same length of time during the starting operation, but the duration of the rich mixture depends on how long the engine has been stopped before starting again, for example, if the engine has been stopped for example three hours or longer during which most of the engine heat due to its operation has been dissipated, then the initially rich mixture will be supplied to the engine for five minutes for example. If the engine has been stopped for only one hour before being started automatically some of the engine heat will still remain in the engine to assist in heating the fuel to volatilize same before starting therefore it will not be necessary to supply a rich mixture for a long time consequently the fuel supply means is arranged to supply the initially rich mixture for one third of the five minute period or one minute and forty seconds. In other words the duration of the supply of rich mixture is in proportion to the time the engine has remained idle up to a certain maximum period of idleness at the end of which the engine would be normally cooled off. Therefore it is apparent that the fuel supply means will supply this initially rich mixture in inverse proportion to the ability of the engine to heat the fuel to volatilize same.

The initially rich mixture is one which is richer in liquid fuel than the fuel mixture supplied during the normal running of the engine, but this rich mixture is not constant in proportion whereby for example the engine has remained idle for three hours the mixture will be richer than where the engine has remained idle for but one hour. Therefore the fuel supply means provides a starting mixture the richness of which is inversely proportional to the ability of the engine to volatilize its own fuel.

The fuel supply means includes provisions for regulating the supply of the initially rich mixture in accordance with environment temperature, for example, the engine will not cool off so rapidly in warm weather as in cold weather, therefore the quantity of an initially rich mixture to be supplied in warm weather will not be so great as would be necessary in cold weather.

Except as the fuel supply system enters into the combination with the automatic generating plant the fuel supply system per se is not claimed in the present application but described more particularly in the copending application of Joseph C. Federle, Serial No. 590,002 filed September 22, 1922. For the present purposes it is sufficient to state that the fuel system includes a supply tank 200 having an outlet pipe 201 connected with a pump inlet 202 provided in the carburetor frame 173. Frame 173 is provided with a pump cylinder 203 which has communication with the inlet 202 controlled by a check valve 204. A pump plunger 205 provided with a ball check valve 206 reciprocates within the cylinder 203, the upper end of the plunger being connected at 207 with the lever 208 which is fulcrumed at 209 on a post 210. Lever 208, is connected by link 211 with an operating part of the engine preferably a rocker arm as disclosed in copending application of Lester S. Keilholtz Serial #225,212 filed March 28, 1918. As the engine operates fuel is drawn from the tank 200 and passes up through an opening 212 from the pump plunger 205 and into a reservoir 213. When the fuel has reached the level 214 shown in Fig. 9 the excess fuel will flow over the overflow weir 215 and down the return pipe 216 to the tank 200. Therefore during the operation of the engine there is a substantially constant level of fuel in the carburetor reservoir.

Now suppose the engine has remained idle for a considerable period, three hours for example, then all the fuel which was in the reservoir 213 will have made its way through a felt plug 217 and down through a passage 218 and into the initially rich well 219. The capacity of this well 219 is such that when all the fuel in reservoir 213 has passed into it, the level of the fuel will be at the line 220. A disc 221 rests upon the plug 217 and pressure upon the plug is controlled by screw 222 bearing against the disc 221 and having threaded engagement with bushing 223 which is threaded into the casting 173. A clip 224 engaging the head of screw 222 serves to prevent accidental movement of this screw. By adjusting the screw up and down the pressure on the felt plug 217 is regulated. Therefore the movement of the fuel from the reservoir 213 into the well 219 can be regulated so as to permit more fuel to reach the well 219 in cold weather than in warm weather in a predetermined length of time.

When the engine is started the suction thereof would cause fuel to be drawn up through the tube 225 from the well 219 and up through the nozzle 26 which is controlled by a needle valve 181. Air for the fuel mixture is drawn by the suction of the engine through the breather 230 which is constructed in accordance with the structure shown in copending application of Lester S. Keilholtz and Ernest Dickey, Serial No. 290,247, filed June 19, 1920. For the present purposes it is sufficient to say that a mixture of fresh air and crank case fumes will be drawn through the passage 232 which includes the restriction 233 leading past the nozzle 226 and into the passage 177. The flow into the passage 232 is controlled by a disc valve 234 held upon its seat by means of a spring 235. Rotation of the valve is effected by means of a handle 236 connected with valve shaft 237.

As the engine is being cranked the rate of flow of fuel passing through the pipe 225 is greater than through the passage 218 therefore the level of fuel in the well 219 will drop to the level 240; and as the fuel level falls through this distance the richness of this mixture will decrease. The capacity of the well 219 is more than sufficient to provide for engine starting in cold weather with the assistance of the heating coil 25 therefore the engine will be normally self-operative long before the fuel has dropped to the level 240. In normal operation of the engine the starting will be accomplished in at least two minutes, and if the capacity of the tank is for a five minute cranking period, then the level of fuel in well 219 will fall down about two fifths of the distance of levels 220 and 240. By the time the engine becomes self-operative and by the time the reservoir 213 is full to overflowing the level in the well 219 will be approximately down to the line 245.

It is desirable to withdraw fuel from well 219 down as near to the level 240 as possible before any more fuel is drawn into the well in order to maintain the relatively low level of fuel in the well 219 which is required for the running fuel mixture of the engine. Therefore the means for siphoning fuel from the reservoir 213 to the well 219 is constructed so as to start action only after fuel in well 219 is down near the level 240, and so as to limit the amount of fuel being siphoned so that the level of fuel in well 219 will be somewhere near the level 240. Therefore one leg of the siphon is constructed so that the liquid level therein may lower a relatively great distance before enough vacuum is created to start siphoning, and then the further lowering of the level a relatively short distance in this leg will produce enough vacuum to maintain siphoning to the desired extent.

This siphon comprises a long leg or pipe 241 extending down to the level 247 where it merges into an enlargement 248 which extends down below the level 240, a branch or restricted passage 242 over the top of ledge 243, and a short leg measured by the distance from ledge 243 to the bottom of web 244.

As the engine continues to operate the level in well 219 will fall down to the level 240, but the level of fuel in the pipe 241 will not fall immediately to this level 240, because the outlet opening from the reservoir 213 leading under the web 244 and into the pasage 242 and pipe 241 has been sealed by the fuel in the reservoir. The lowering of the fuel level in the pipe 241 will be slowed down relatively to the lowering of the fuel in well 219 because a vacuum is now being created in the passage 242 and pipe 241. But the pipe 241 is so small that siphoning will not take place when the level in well 219 starts to fall below level 245. The level in the long siphon leg must first reach the level 246 before enough vacuum will be created to start the siphoning. As the internal diameter of the enlargement 248 is large relative to diameter of pipe 241, the relative small drop in level from 247 to 246 will maintain the requiring siphoning action, that is, overcome the head of fuel measured by the distance from ledge 242 to the fuel level in reservoir 213 as it drops from level 214 to the bottom of web 244.

If the pipe 241 continued at the small diameter down below the level 240, the lowering of the level 245 to 240 would not create enough vacuum in pipe 241 to pull the fuel over the ledge 243 from the reservoir 213, as this level falls from 214 to the lower edge of web 244. If the enlargement 248 be made too long, then the siphoning will begin too soon and the fuel in well 219 will not reach the desired low level during the running of the engine.

By the time the fuel in the long siphon leg has reached the level 246 there will be enough vacuum created to produce siphoning and the fuel will be siphoned from the reservoir 213 until the level in the reservoir 213 drops from the line 214 down to the lower edge of the web 244. Then the pipe 241 will be opened to atmosphere and the fuel in it will seek the level of the fuel in 219 and will raise the level of fuel in well 219 from the level 240 to the level 247. Therefore during the operation of the engine after it has become self-operative the fuel level in the well 219 will be somewhere between the levels 247 and 240. The web 244 extends below the level 214 the required distance to limit the amount of fuel siphoned, so that the level 247 will not be but a short distance above level 240. Therefore fuel mixture during engine running will tend to be uniform.

The siphoning action described will be somewhat intermittent but owing to the restriction 242 the fuel pump will be permitted to "catch up" with the siphoning action, that is, the siphoning will be retarded somewhat to permit the level to fall slowly from 214 to the level under the web 244 and the result of this is that the flow of fuel down the pipe 241 is substantially continuous while it may vary in volume to some extent. For example, the siphoning may continue two minutes and then the capillary attraction through the restricted passage 242 may be broken up for a brief period then the siphoning may start again. However, the fuel level in well 219 will remain practically constant and will be somewhere between the levels 240 and 247 for example.

It will be noted that the restricted passage 242 extends across the ledge 243 but not down into the reservoir 213. This construction is to prevent capillarity being substantially effective along the web 244. If capillarity was effective at this place siphoning would be more readily effective and all of the fuel pumped by the fuel pump would tend to pass over into the well 219 as fast as the pump would deliver fuel to the reservoir 213.

The advantage of foregoing siphoning is apparent when for example the plant has been idle for an hour, the fuel level in the reservoir 213 is below the web 244 and therefore the passage 242 is not sealed, and the fuel in the well 219 has only raised to approximately one third of its maximum height. Then, as the fuel falls in the well 219 when the engine is again operated, by the time the level in reservoir 213 has been raised to seal the passage 242 the level of the fuel in the well 219 will be down to approximately at 247. However as soon as the level of fuel in the siphon leg falls to the level 247 the vacuum in said siphon leg will be increased quickly due to the large diameter of the member 248. In this manner as is quite evident the fuel in the pipe 241 does not initially have to be high to provide the required vacuum, when receding, for siphoning over the fuel.

It is apparent from the foregoing that the engine has been supplied with a starting mixture the richness of which will vary according to the level in the well 219 at that time the starting of the engine is initiated. The duration of the supply of the starting mixture will depend also on the level of the fuel in the well 219. After the engine has become self-operative the fuel mixture will be maintained substantially constant for a given throttle opening.

Another form of initial rich mixture device is shown in Fig. 13. In this view a needle valve 281 is temporarily raised a little distance so that a larger quantity of fuel can pass to the engine when starting than when running. In this form a rich mixture device a casting 273 is provided which is connected to the engine cylinder head 178 and breather 230 in the same manner as casting 173 shown in the other views. Fuel is pumped into a reservoir 313, formed by the casting 273, in the same manner as it is pumped into the reservoir 213 shown in the other views. The fuel is maintained at a level substantially as shown. Casting 273 is provided with an opening 274 through which a pipe 275 is inserted. This pipe is then placed in the position shown and forms a jet having communication with the reservoir 313 and restricted passage 233. Screw threaded into the opening 274 is an adjustable sleeve 276 which is locked in its desired position by lock nut 277. A needle valve 281 is slidably mounted in the sleeve 276 and cooperates with the jet so as to restrict the jet opening. Valve 281 has spaced shoulders 282 and 283. Shoulder 283 normally rests on the top of sleeve 276 and, as can be seen, the raising or lowering of the sleeve 276 will cause the valve 281 to be moved away or permit it to move closer to the jet. Located between the shoulders 282 and 283 is a forked armature projection 284 carried by an armature 285. Armature 285 is pivotally mounted on a bracket 286 which is carried on the top of casting 273. The bracket 286 also carries a coil 287 which when energized will attract the armature 285 causing the forked projection 284 to engage the under side of shoulder 283 to move the valve 281 away from the jet. A spring 293 normally tends to hold the armature 285 in its unattracted position and also causes the forked projection 284 to bear downwardly upon the shoulder 283 to hold said shoulder firmly upon the sleeve 276, when coil 287 is not energized. Coil 287 is connected by wires 288 and 289, respectively, with pivot 161 of lever 89 and with thermostat switch blade 290 mounted on the engine cylinder head. Blade 290 normally engages contact 291 connected by wire 292 with wire 96. Whenever relay 70 is energized to attract armature 74 into contact with contact 77, the circuit to the temporary rich mixture relay 287 will be closed. This circuit will remain closed during the starting of the engine and will remain closed even after the engine has become self-operative, in order to insure that the engine remain self-operative. As the engine may require a longer warming up period in cold weather it is desirable to cause the relay 287 to remain energized for a longer time in cold weather. Therefore the blade 290 is subjected to environment temperature and will require a longer warming up period before it will bend away from contact 291 to open the relay 287. It is apparent that the engine will be supplied with the temporary rich mixture until the engine head is warmed up to the desired temperature, when the blade 290 will bow away from the contact 291. The duration of supply of temporary rich mixture is substantially in inverse proportion to the ability of the engine to volatilize its own fuel. In other words, the colder the engine, the greater will be the duration of supply of rich mixture.

It will be noted that the cranking cut-out will interrupt the circuit to the coil 287 by the separation of parts 88 and 89.

The throttle valve 22 cooperates with the restrictions 233 of passage 232 to provide a variable Venturi passage as the position of the valve 22 is varied by the action of the electric throttle governor. By varying the Venturi effect as the throttle is opened or closed it has been found that the proportion of fuel air mixture passing through the passage 177 will remain substantially constant for varying throttle openings. In controlling the fuel mixture proportion the relation of the nozzle 226 to the throttle 22 is important. It has been found that this nozzle should be located as in Fig. 7 close to the edge of the notch 180. It has been found satisfactory when the axis of the nozzle is substantially tangent to the periphery of drum of metal of valve 22.

It is apparent that it is advantageous to use in an automatic plant a fuel supply system which provides an initially rich starting mixture in order that starting may be accomplished automatically without taking too much current from the storage battery. While the fuel system provides for starting, it is desirable that it provide for economic use of the fuel for running; and this is best accomplished by maintaining a constant fuel mixture for varying engine speed determined by the action of the electrical governor included in the automatic system.

The fuel system and the automatic engine starter co-operate to provide for starting the plant under various conditions. If the plant is started in cold weather, a longer possible cranking period is provided since the cranking cut-out will not operate so soon in cold weather as in warm weather. The fuel system provides an initially rich starting mixture to take care of the maximum possible cranking period.

The plant will be started more or less frequently according as demands for dynamo current are made. The more frequent these demands, the easier it will be to start the plant, generally, because the engine will be less cool on starting than when the demands are less frequent. The fuel supply system supplies the initially rich starting mixture for a shorter time when the demands are frequent and for a longer time up to a certain limit when the period of plant idleness is longer.

While the forms of mechanism herein shown and described constitute preferred embodiments of one form of invention, it is to be understood that other forms might be adopted and various changes and alterations made in the shape, size, and proportion of the elements therein without departing from the spirit and scope of the invention.

What we claim is as follows:

1. In an electrical generating system, the combination of an internal-combustion engine and a dynamo operable as a motor for starting the engine or as a generator driven by the engine; of a storage battery; of a work circuit adapted to be energized by the dynamo; of a second work circuit adapted to be energized by said battery or dynamo; of means operated automatically in response to an excess demand in said second work circuit for controlling the connection between the dynamo and battery for causing the dynamo to start the engine and, after said engine is self operative, for maintaining said connection, said means having provisions including a relay for withholding the operating current from the first work circuit until the output of the dynamo attains a substantial value.

2. In an electrical generating system, the combination of an internal-combustion engine and a dynamo operable as a motor for starting the engine or as a generator driven by the engine; of a storage battery; of a work circuit adapted to be energized by the dynamo; of a second work circuit adapted to be energized by said battery or dynamo; of means operated automatically in response to an excess demand in said second circuit or to a demand in said first circuit for controlling the connection between the dynamo and battery for causing the dynamo to start the engine and, after said engine is self operative, for maintaining said connection, said means having provisions including a relay for withholding the operating current from the first work circuit until the output of the dynamo attains a substantial value.

3. In an electrical generating system, the combination of an internal-combustion engine and a dynamo operable as a motor for starting the engine or as a generator driven by the engine; of a storage battery; of a work circuit adapted to be energized by the dynamo; of a second work circuit adapted to be energized by the battery or dynamo; of means operated automatically in response to a demand for battery recharge or to demand in said second circuit for controlling the connection between the dynamo and battery for causing the dynamo to start the engine and, after said engine is self operative, for maintaining said connection, said means having provisions including a relay for withholding the operating current from the first work circuit until the output of the dynamo attains a substantial value.

4. In an electrical generating system, the combination of an internal-combustion engine and a dynamo operable as a motor for starting the engine or as a generator driven by the engine; of a storage battery; of a work circuit adapted to be energized by the dynamo; of a second work circuit adapted to be energized by said battery or dynamo; of means operated automatically in response to an excess demand in said second circuit, or to a demand in the first circuit, or to a demand for battery recharge for controlling the connection between the dynamo and battery for causing the dynamo to start the engine and, after said engine is self operative, for maintaining said connection, said means having provisions including a relay for withholding the operating current from the first work circuit until the output of the dynamo attains a substantial value.

5. In an electrical generating system, the combination of an internal-combustion engine and a dynamo driven thereby; of a storage battery; of a circuit supplied by the dynamo; of a second circuit supplied by the dynamo or battery; and means operated automatically in response to a demand in the first circuit or to an excess demand in the second circuit for controlling the connection between the dynamo and battery for causing the dynamo to start the engine and, after said engine is self operative, for maintaining said connection, said means having provisions including a relay for withholding the operating current from the first circuit until the output of the dynamo attains a substantial value, said means being adapted to maintain the battery and dynamo connected after the demand in the circuit which caused the connection has been satisfied providing there is a demand from the dynamo by the other work circuit.

6. In an electrical generating system, the combination of an internal-combustion engine and a dynamo having a plurality of field circuits, said dynamo being adapted to function as a motor for cranking the engine or as a generator with certain of said field circuits operative; of a storage battery; of a switch for connecting the dynamo with the battery with certain other of said field circuits operative whereby the dynamo functions as a high torque motor for cranking the engine, said switch being adapted to maintain the battery connected with the dynamo after the engine is self operative; of means for rendering certain of said field circuits inoperative; and means responsive to the speed of said engine for controlling the first means.

7. In an electrical generating system, the combination of an internal combustion engine and a dynamo having a plurality of field circuits, said dynamo being adapted to function as a motor for cranking the engine or as a generator with certain of said field circuits operative; of a storage battery; a switch for connecting the dynamo with the battery with certain other of said field circuits operative whereby the dynamo functions as a high torque motor; means operated automatically in response to a demand for current from the dynamo for closing said switch and for maintaining said switch closed as long as said demand continues; means for rendering certain of said field circuits ineffective; and a device responsive to the speed of said engine for controlling said last means.

8. In an electrical generating system, the combination of an internal-combustion engine and a dynamo having a plurality of field circuits, said dynamo being adapted to function as a motor for cranking the engine or as a generator with certain of said field circuits operative; of a storage battery; of a work circuit adapted to be energized by said dynamo; of a switch for connecting the dynamo with the battery with certain other of said field circuits operative whereby the dynamo functions as a high torque motor for cranking the engine, said switch being adapted to maintain the battery connected with the dynamo after the engine is self operative; of means for rendering certain of said field circuits inoperative and for connecting the dynamo with the work circuit; and means responsive to the speed of the engine for controlling the first means.

9. In an electrical generating system, the combination of an internal-combustion engine and a dynamo having a plurality of field circuits, said dynamo being adapted to function as a motor for cranking the engine or as a generator with certain of said field circuits operative; of a storage battery; of a work circuit adapted to be energized by the dynamo; of a switch operated automatically in response to a demand in said work circuit for connecting the dynamo with the battery with certain other of said field circuits operative whereby the dynamo functions as a high torque motor for cranking the engine, said switch being adapted to maintain the battery connected with the dynamo after the engine is self operative; of means for rendering certain of said field circuits inoperative and for connecting the dynamo with the work circuit; and means responsive to the speed of the engine for controlling the first means.

10. In an electrical generating system, the combination of an internal-combustion engine and a dynamo having a plurality of field circuits, said dynamo being adapted to function as a motor for cranking the engine or as a generator with certain of said field circuits operative; of a storage battery; of a work circuit adapted to be energized by the dynamo; of a second work circuit adapted to be energized by the battery or dynamo; of means operated automatically in response to an excess demand in said second work circuit for connecting the dynamo with the battery with certain other of said field circuits operative whereby the dynamo functions as a high torque motor for cranking the engine, said switch being adapted to maintain the battery connected with the dynamo after the engine is self operative; of means for rendering certain of said field circuits inoperative; of a switch for connecting the dynamo with the first work circuit; and a relay adapted to control said field circuit controlling means and said work circuit switch after the output of the dynamo attains a substantial value.

11. In an electrical generating system, the combination of an internal-combustion engine and a dynamo having a plurality of field circuits, said dynamo being adapted to function as a motor for cranking the engine or as a generator with certain of said field circuits operative; of a storage battery; of a work circuit adapted to be energized by the dynamo; of a second work circuit adapted to be energized by the battery or dynamo; of means operated automatically in response to an excess demand in said second work circuit or to a demand in said first circuit for connecting the dynamo with the battery with certain other of said field circuits operative whereby the dynamo functions as a high torque motor for cranking the engine, said switch being adapted to maintain the battery connected with the dynamo after the engine is self operative; of means for rendering certain of said field circuits inoperative; of a switch for connecting the dynamo with the first work circuit; and a relay adapted to control said field circuit controlling means and said work circuit switch after the output of the dynamo attains a substantial value.

12. In an electrical generating system, the combination of an internal-combustion engine and a dynamo having a plurality of field circuits, said dynamo being adapted to function as a motor for cranking the engine or as a generator with certain of said field circuits operative; of a storage battery; of a work circuit adapted to be energized by said dynamo; of a second work circuit adapted to be energized by the battery or dynamo; of means operated automatically in response to a demand for battery recharge or to an excess demand in said second work circuit for connecting the dynamo with the battery with certain other of said field circuits operative whereby the dynamo functions as a high torque motor for cranking the engine, said switch being adapted to maintain the battery connected with the dynamo after the engine is self operative; of means for rendering certain of said field circuits inoperative; of a switch for connecting the dynamo with the first work circuit; and a relay adapted to control said field circuit controlling means and said work circuit switch after the output of the dynamo attains a substantial value.

13. In an electrical generating system, the combination of an internal-combustion engine and a dynamo having a plurality of field circuits, said dynamo being adapted to function as a motor for cranking the engine or as a generator with certain of said field circuits operative; of a storage battery; of a work circuit adapted to be energized by said dynamo; of a second work circuit adapted to be energized by the battery or dynamo; of means operated automatically in response to a demand for battery recharge or to an excess demand in said second work circuit or to a demand in said first work circuit for connecting the dynamo with the battery with certain other of said field circuits operative whereby the dynamo functions as a high torque motor for cranking the engine, said switch being adapted to maintain the battery connected with the dynamo after the engine is self operative; of means for rendering certain of said field circuits inoperative; of a switch for connecting the dynamo with the first work circuit; and a relay adapted to control said field circuit controlling means and said work circuit switch after the output of the dynamo attains a substantial value.

14. In an electrical generating system, the combination with an internal combustion engine and a dynamo adapted to be driven thereby; of a battery adapted to be charged by said dynamo at a certain voltage; means for causing said engine to drive the dynamo; means normally tending to render said engine inoperative to drive the dynamo when the battery is charged; a work circuit adapted to be energized by said dynamo; means for maintaining the first means operative as long as there is a demand for current from the dynamo by said work circuit; a device for decreasing the voltage of said dynamo, said device being rendered operable by the second means when the battery is charged and when there is a demand in the work circuit.

15. Control mechanism for an electrical generating system which system comprises a storage battery and a dynamo adapted to be connected with the battery for charging same, said mechanism including, contacts for controlling said system; a magnet winding controlling said contacts and having sufficient ampere turns for actuating said contacts to disconnect the battery from the dynamo; means for limiting the ampere turns of the winding, said winding having sufficient ampere turns for maintaining the contacts in a position in which the dynamo and battery are disconnected although the limiting means is effective, but having insufficient ampere turns for moving said contacts to said position when the limiting means is effective; means responsive to a certain low state of battery charge for rendering the winding ineffective for maintaining the contacts in dynamo and battery disconnecting position, and responsive to a certain high state of battery charge for rendering said limiting means ineffective.

16. In an electrical generating system, the combination with an internal-combustion engine and a dynamo driven thereby; of a work circuit; automatic means responsive to a work circuit demand for causing the engine to be operative to drive the dynamo, said automatic means including provisions for discontinuing the engine starting operation in case the engine fails to start within a certain time, said provisions being responsive to environment temperature to give a longer starting period in cool weather than in warm weather; and engine fuel supply means for supplying the engine with a relatively rich starting mixture for a certain period of engine starting and thereafter a relatively leaner mixture for engine running, the quantity of available starting mixture being greater the longer the interval of engine idleness, and in case this interval is long enough for the engine to become cold, then enough starting mixture is available during the greatest possible period of operation of the automatic means.

17. An electrical current supplying system, comprising a storage battery, a work circuit connected with said battery and adapted to contain a translating device operating at substantially the voltage of said battery, a source of current of substantially the same voltage as said battery, said source comprising a prime-mover-generator set, means for connecting said source across the terminals of the battery to supplement the output and charge the latter, and means for withholding operating current to the translating device of said work circuit in quantity sufficient to operate the same until the generator of said prime-mover-generator set has attained said voltage and is in supplementing relationship with said source, said first mentioned means having provisions for supplementing said battery with said source immediately upon attainment of proper generator voltage.

18. An electrical current supplying system, comprising a source of current, a work circuit connected with said source and adapted to contain a translating device operating at substantially the voltage of said source, a second source of current of substantially the same voltage as said first source, said second source comprising a prime-mover-generator set, means responsive to a demand in said work circuit for placing said prime-mover-generator set in operation, means for connecting said second source across the terminals of said first source to supplement the output of the latter, and means for withholding operating current to the translating device of said work circuit in quantity sufficient to operate the same until the generator of said prime-mover-generator set has attained said voltage and is in supplementing relationship with said first source, said connecting means having provisions for supplementing said first source with said second source immediately upon attainment of proper generator voltage.

19. An electrical current supplying system, comprising a source of current, a work circuit connected with said source and adapted to contain a translating device operating at substantially the voltage of said source, a second source of current of substantially the same voltage as said first source, said second source comprising a prime-mover-generator set, means for connecting said second source across the terminals of said first source to supplement the output of the latter, and means for withholding operating current to the translating device of said work circuit in quantity sufficient to operate the same until the generator of said prime-mover-generator set has attained said voltage and is in supplementing relationship with said first source, said first mentioned means having provisions for supplementing said first source with said second source immediately upon attainment of proper generator voltage.

20. In an electrical generating system, the combination with a prime mover and a dynamo adapted to be driven thereby; a work circuit containing a translating device adapted to receive operating current only when the dynamo is generating current; a battery; a second work circuit containing a translating device adapted to receive operating current from the dynamo or from the battery; means responsive to a demand in the first work circuit or an excess demand in the second work circuit or a demand for battery recharge for causing the prime mover to drive the dynamo, said means having provisions for limiting the flow of current from the battery to the first work circuit to a value insufficient to operate the translating device in said first work circuit; and means rendered operable when the dynamo attains a predetermined voltage for connecting said first work circuit with the dynamo.

21. In an electrical generating system, the combination with a prime mover and a dynamo adapted to be driven thereby; a work circuit containing a translating device adapted to receive operating current only when the dynamo is generating current; a battery; a second work circuit containing a translating device adapted to receive operating current from the dynamo or from the battery; means responsive either to a demand in the first work circuit or an excess demand in the second work circuit for causing the prime mover to drive the dynamo, said means having provisions for limiting the flow of current from the battery to the first work circuit to a value insufficient to operate the translating device in said first work circuit; and means rendered operable when the dynamo attains a predetermined voltage for connecting said first work circuit with the dynamo.

22. In an electrical generating system, the combination with a prime mover and a dynamo adapted to be driven thereby; a work circuit containing a translating device adapted to receive operating current only when the dynamo is generating current; a battery; a second work circuit containing a translating device adapted to receive operating current from the dynamo or battery; means responsive to a demand in the first work circuit for causing the prime mover to drive the dynamo, said means having provisions for limiting the flow of current from the battery to the first work circuit to a value insufficient to operate said device in said work circuit; and means rendered operable when the dynamo attains a predetermined voltage for connecting said first work circuit with the dynamo.

23. In an electrical generating system, the combination with a prime mover and a dynamo adapted to be driven thereby; a work circuit containing a translating device adapted to receive operating current only when the dynamo is generating current; a storage battery adapted to be charged by the dynamo; a second work circuit containing a translating device adapted to receive operating current from the dynamo or from the battery; means responsive to a demand in one of said work circuits for causing the prime mover to drive the generator, said means having provisions for limiting the flow of current from the battery to the first work circuit to a value insufficient to operate said device in said work circuit; and means rendered operable when the dynamo attains a predetermined voltage for connecting said first work circuit to the dynamo.

24. In an electrical generating system, the combination with a prime mover and a dynamo adapted to be driven thereby; a work circuit containing a translating device adapted to receive operating current only when the dynamo is generating current; a storage battery adapted to be charged by the dynamo; a second work circuit containing a translating device adapted to receive operating current from the dynamo or from the battery; means responsive to a demand for battery recharge for causing the prime mover to drive the dynamo, said means having provisions for limiting the flow of current from the battery to the first work circuit to a value insufficient to operate said device in said work circuit; and means rendered operable when the dynamo attains a predetermined voltage for connecting said first work circuit with the dynamo.

25. In an electrical generating system, the combination with a prime mover and a dynamo adapted to be driven thereby; a work circuit containing a translating device adapted to receive operating current only when the dynamo is generating current; a storage battery adapted to be charged by the dynamo; a second work circuit containing a translating device adapted to receive operating current from the battery or from the dynamo; means for causing the prime mover to drive the dynamo to supply operating current to said devices and for charging the battery; and control mechanism responsive to a demand for battery recharge for controlling the first means and for limiting the current flow from the battery to the first work circuit to a value insufficient to operate the device in said first work circuit.

26. In an electrical generating system, the combination with a prime mover and a dynamo adapted to be driven thereby; a work circuit containing a translating device adapted to receive operating current only when the dynamo is generating current; a storage battery adapted to be charged by the dynamo; a second work circuit containing a translating device adapted to receive operating current from the battery or from the dynamo; means for causing the prime mover to drive the dynamo to supply operating current to said devices and for charging the battery; a circuit connecting said first work circuit with the battery and energized upon demand in said first work circuit; and control mechanism associated with the connecting circuit and with the battery for controlling the first means when there is a demand in the first work circuit or a demand for battery recharge and for limiting the flow of current from the battery to the first work circuit to a value insufficient to operate said device in said work circuit.

27. In an electrical generating system, the combination with a prime mover and a dynamo adapted to be driven thereby; a work circuit containing a translating device adapted to receive operating current only when the dynamo is generating current; a storage battery adapted to be charged by the dynamo; a second work circuit containing a translating device adapted to receive operating current from the battery or from the dynamo; means for causing the prime mover to drive the dynamo to supply operating current to said devices and for charging the battery; a circuit connecting said second work circuit with the battery and energized upon demand in said second work circuit; and control mechanism associated with the connecting circuit for controlling the first means when there is an excess demand in the second work circuit or a demand for battery recharge and for limiting the current flow from the battery to the first work circuit to a value insufficient to operate the device in said first work circuit.

28. In an electrical generating system, the combination with a prime mover and a dynamo adapted to be driven thereby; a work circuit containing a translating device adapted to receive operating current only when the dynamo is generating current; a storage battery adapted to be charged by the dynamo; a second work circuit containing a translating device adapted to receive operating current from the battery or from the dynamo; means for causing the prime mover to drive the dynamo to supply operating current to said devices and for charging the battery; a circuit connecting said first work circuit with the battery and energized upon demand in either of said work circuits; and control mechanism associated with the connecting circuits and with the battery for controlling the first means when there is a demand in the first work circuit or an excess demand in the second work circuit or a demand for battery recharge and for limiting the current flow from the battery to the first work circuit to a value insufficient to operate the devices in said first work circuit.

29. In an electrical generator system, the combination with an internal combustion engine and a dynamo adapted to function as a motor for cranking said engine; of a battery; control mechanism for connecting the dynamo with the battery, said control mechanism including provisions for discontinuing the engine cranking operating in case the engine fails to start within a certain time, said provisions being responsive to environment temperature to give a longer cranking period in cool weather than in warm weather; and engine fuel supply means for supplying the engine with a relatively rich starting mixture for a certain period of engine starting and thereafter a relatively leaner mixture for engine running, the quantity of available starting mixture being greater the longer the interval of engine idleness, and in case this interval is long enough for the engine to become cold, then enough starting mixture is available during the greatest possible period of operation of said control mechanism.

In testimony whereof we hereto affix our signatures.

CHARLES F. KETTERING.
JOSEPH C. FEDERLE.